UNITED STATES PATENT OFFICE.

JOSEPH NICKERSON, OF BOOTHBAY, MAINE.

IMPROVED PROCESS OF PREPARING FISH FOR FOOD.

Specification forming part of Letters Patent No. 88,064, dated March 23, 1869.

*To all whom it may concern:*

Be it known that I, JOSEPH NICKERSON, of Boothbay, in the county of Lincoln, State of Maine, have invented a new and Improved Method of Preparing Fish for Commerce; and I do hereby declare that the following is a full and exact description thereof.

The nature of my invention consists in a novel process of preparing fish for preservation and transportation, and thus enhancing its value as an article of commerce.

To enable others to understand and make use of my improved method, I will proceed to set it forth in detail.

Ordinary salted fish is cleansed and cleared from all refuse matter, such as skin, scales, fins, bones, &c.; then, having been reduced, by proper manipulation, to a granulated state, the whole is steeped in saturated brine until every particle of the mass is completely penetrated by the brine, after which it is subjected to great pressure in molds, the pressure serving the double purpose of forcing out all surplus moisture and reducing the fish to hardened cakes of convenient size.

Having thus described my invention, what I claim as new, and desire to secure by Letters Patent, is—

The method above described of preparing fish.

JOSEPH NICKERSON.

Witnesses:
  R. N. EAGLE,
  WILLIAM EDSON.